US00RE47335E

(19) United States
(12) Reissued Patent
Wolf

(10) Patent Number: US RE47,335 E
(45) Date of Reissued Patent: Apr. 2, 2019

(54) FIREARM WITH INTERCHANGEABLE CALIBERS AND/OR IMPROVED SIGHTS

(71) Applicant: ZEV TECHNOLOGIES, INC., Oxnard, CA (US)

(72) Inventor: Alec Daniel Wolf, Santa Monica, CA (US)

(73) Assignee: ZEV Technologies, Inc., Oxnard, CA (US)

(21) Appl. No.: 14/841,298

(22) Filed: Aug. 31, 2015

Related U.S. Patent Documents

Reissue of:
(64) Patent No.: 8,893,422
Issued: Nov. 25, 2014
Appl. No.: 14/071,942
Filed: Nov. 5, 2013

U.S. Applications:
(62) Division of application No. 13/621,713, filed on Sep. 17, 2012, now Pat. No. 8,832,983.

(60) Provisional application No. 61/627,035, filed on Sep. 16, 2011.

(51) Int. Cl.

| | |
|---|---|
| ***F41G 1/16*** | (2006.01) |
| ***F41A 3/12*** | (2006.01) |
| ***F41G 1/00*** | (2006.01) |
| ***F41A 21/48*** | (2006.01) |
| ***F41C 3/00*** | (2006.01) |

(52) U.S. Cl.
CPC ..... *F41A 3/12* (2013.01); *F41G 1/00* (2013.01); *F41G 1/16* (2013.01); *F41A 21/48* (2013.01); *F41C 3/00* (2013.01)

(58) Field of Classification Search
CPC .... F41A 3/12; F41A 21/48; F41G 1/00; F41G 1/16; F41C 3/00
USPC ..... 42/111, 115, 124, 125, 126, 127, 135, 42/136, 137, 139, 148
See application file for complete search history.

(56) References Cited

U.S. PATENT DOCUMENTS

| | | | | | |
|---|---|---|---|---|---|
| 428,458 | A * | 5/1890 | Cochran et al. | 42/139 | |
| 1,257,713 | A * | 2/1918 | Johnson | 42/137 | |
| 2,030,312 | A * | 2/1936 | Mossberg | F41G 1/04 | 42/111 |
| 2,079,266 | A * | 5/1937 | Vaver | 42/148 | |
| 2,162,090 | A * | 6/1939 | King | 42/137 | |
| 2,438,601 | A * | 3/1948 | Davis | 42/137 | |
| 2,465,561 | A * | 3/1949 | Wilson | 42/139 | |
| 2,585,395 | A * | 2/1952 | Martin | F41G 1/26 | 42/137 |
| 2,774,143 | A * | 12/1956 | Sunderland | F41G 1/26 | 42/137 |

(Continued)

*Primary Examiner* — Jeffrey R Jastrzab
(74) *Attorney, Agent, or Firm* — Knobbe Martens Olson & Bear LLP

(57) ABSTRACT

A replacement slide assembly for a pistol, the slide assembly having a barrel assembly with a barrel and a firing chamber. The barrel assembly also has a guide member which is a protrusion that extends horizontally outward from the barrel assembly. The replacement slide assembly also includes a housing with an interior wall that defines a groove that receives the guide member. The guide member and the groove in the housing are located forward of a firing pin assembly also mounted within the housing. The slide assembly or any firearm also includes an adjustable sight assembly that permits interchangeability between different types of sights without requiring that the firearm be re-sighted.

23 Claims, 10 Drawing Sheets

New

(56) References Cited

U.S. PATENT DOCUMENTS

| | | | | | |
|---|---|---|---|---|---|
| 3,193,932 | A * | 7/1965 | Johnson | | 42/148 |
| 3,199,202 | A * | 8/1965 | Williams | | 42/137 |
| 3,838,522 | A * | 10/1974 | Williams | | 42/137 |
| 4,008,536 | A * | 2/1977 | Adams | | 42/112 |
| 4,015,354 | A * | 4/1977 | Brouthers | | 42/144 |
| 4,628,611 | A * | 12/1986 | Ruffino | | 42/137 |
| 5,208,407 | A * | 5/1993 | Stover | | 42/112 |
| 5,388,335 | A * | 2/1995 | Jung | | 42/115 |
| 5,467,552 | A * | 11/1995 | Cupp et al. | | 42/125 |
| 5,481,818 | A * | 1/1996 | Stover | | 42/136 |
| 6,213,578 | B1 * | 4/2001 | LaGrotta | H05K 7/142 | 312/223.2 |
| 6,327,806 | B1 * | 12/2001 | Paige | F41G 1/30 | 42/113 |
| 7,032,341 | B1 * | 4/2006 | Sconce et al. | | 42/111 |
| 7,634,866 | B2 * | 12/2009 | Javorsky | | 42/111 |
| 7,730,655 | B2 * | 6/2010 | Spuhr | | 42/127 |
| 8,117,780 | B2 * | 2/2012 | Matthews et al. | | 42/114 |
| 2006/0207157 | A1 * | 9/2006 | Keng | | 42/132 |
| 2007/0199227 | A1 * | 8/2007 | Ertl | | 42/137 |
| 2007/0234625 | A1 * | 10/2007 | Kidd | | 42/111 |
| 2008/0092424 | A1 * | 4/2008 | Keng | | 42/137 |
| 2008/0216379 | A1 * | 9/2008 | Javorsky | | 42/115 |
| 2008/0244953 | A1 * | 10/2008 | Kilic | | 42/127 |
| 2012/0110886 | A1 * | 5/2012 | Moore et al. | | 42/114 |
| 2013/0061511 | A1 * | 3/2013 | Strayer | | 42/136 |
| 2013/0263492 | A1 * | 10/2013 | Erdle | | 42/145 |
| 2013/0283659 | A1 * | 10/2013 | Trapp et al. | | 42/111 |
| 2013/0283660 | A1 * | 10/2013 | Matthews et al. | | 42/113 |
| 2014/0230305 | A1 * | 8/2014 | Zimmer | | 42/111 |

* cited by examiner

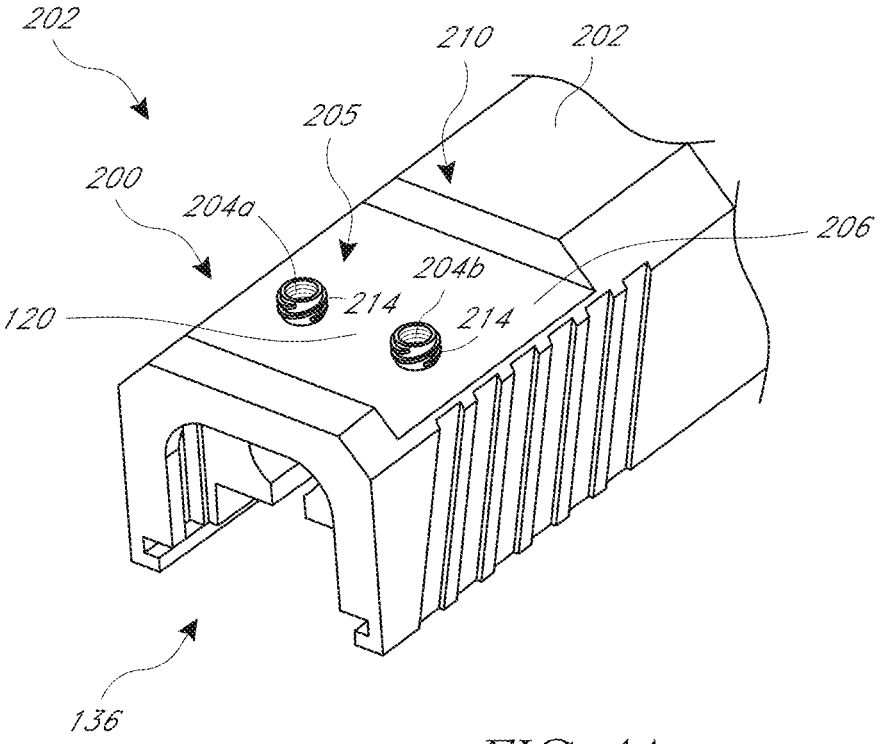
FIG. 4A
New

FIREARM WITH INTERCHANGEABLE CALIBERS AND/OR IMPROVED SIGHTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. patent application Ser. No. 14/071,942, filed Nov. 5, 2013, now U.S. Pat. No. 8,893,422, issued Nov. 25, 2014, which* is a Divisional of U.S. patent application Ser. No. 13/621,713, filed on Sep. 17, 2012, *now U.S. Pat. No. 8,832,983, issued Sep. 16, 2014,* entitled "FIREARM WITH INTERCHANGEABLE CALIBERS AND/OR IMPROVED SIGHTS," which claims the benefit of U.S. Provisional Application No. 61/627,035, filed on Sep. 16, 2011, entitled "CONVERSION SLIDE WITH RETRO-FITTED SIGHTS," which are hereby incorporated by reference in their entirety for all that is taught and disclosed therein.

FIELD OF THE INVENTION

The present invention relates to firearms and, in particular, concerns a system and method of converting the caliber of an automatic pistol from a first caliber to a second and also an improved sight system.

DESCRIPTION OF THE RELATED ART

Automatic pistols are very well known. Many of these pistols comprise a frame that houses a trigger assembly and a magazine. A spring biased, movable slide assembly is then mounted on top of the frame. The slide includes a housing, a firing chamber, a firing pin assembly and a barrel. In operation, the user pulls the trigger which induces the firing pin assembly to strike a cartridge in the chamber, causing the cartridge to fire, resulting in the slug or projectile(s) travelling down the barrel. With slide based pistols, the detonation of the cartridge also results in the slide housing recoiling backwards over the frame and barrel and to then slide forward back into the shooting position as a result of the spring biasing of the slide housing. This backwards and forwards motion of the slide housing performs several functions, including ejecting the spent cartridge casing, cocking the firing pin assembly and loading another cartridge into the chamber when the slide housing comes forward.

Typically, slide assemblies are specific to a particular pistol and allow the shooter to only shoot the caliber of bullet that the barrel, magazine and firing chamber are sized to receive. However, it is often desirable for shooters to be able to practice shooting with less powerful and/or less expensive ammunition. While slide assemblies on many pistols are removable, the easy interchangeability of the slide assemblies is limited.

More specifically, some pistols, such as those manufactured by Glock Ges.m.b.H. of Austria are designed to be modular such that the various components, e.g., the slide assembly, the magazine, the trigger assembly, etc., can be easily removed from the frame of the pistol. However, while removing a slide and a magazine is relatively easy with Glock™ pistols, changing the slide and magazine to a different caliber is more complicated.

For example, it is often desirable to be able to fire low power and inexpensive .22 caliber ammunition in more powerful, higher caliber pistols. The lower power .22 caliber ammunition allows a shooter to become familiar with the feel of the pistol while shooting a round that has less recoil and is considerably cheaper than larger pistol calibers. Moreover, the reduced power of the smaller .22 caliber ammunition allows it to be shot at smaller range facilities and the like.

However, switching to a smaller round like a .22 caliber is complicated by the fact that the smaller caliber may not have sufficient power to cycle the slide housing back and forth over the frame. Moreover, many slide pistols, such as Glock™ pistols are designed such that the barrels pivot with respect to the slide housing so as to facilitate loading of the next round in the magazine. Often smaller caliber cartridges, such as the .22 caliber, produce insufficient recoil of the slide assembly to both cycle the slide housing over the frame and pivot the barrel with respect to the slide housing to load the next cartridge in the magazine into the firing chamber.

Some efforts have been made by others to address this issue by designing the magazine to spring load the next cartridge in line with the firing chamber such that the firing chamber and barrel do not pivot with respect to the slide. In these products, the barrel and firing chamber slide straight back and the spring loaded magazine urges the next cartridge into the firing chamber when the firing chamber is exposed to the magazine. This requires that the barrel and firing pin assembly move in a straight line with respect to the slide and frame.

To achieve the straight line motion of the barrel assembly with respect to the slide housing, the prior art product incorporates a guide that is engaged with the housing of the trigger assembly. The guide member and the trigger assembly are interconnected in such a way that the barrel and firing pin assembly cannot be removed from slide housing without the removal of the firing pin assembly. Alternatively, in some prior art products, the guide member has to be interconnected to the barrel assembly which complicates the installation and removal process.

This complicates the process of disassembling the converted barrel which further complicates cleaning of the components of the replacement slide assembly and the complexity of interaction between the components of the conversion slide makes the conversion slide potentially less reliable and more expensive Thus, there is a need for an improved conversion slide assembly for slide based semi-automatic pistols.

A further difficulty with both original and replacement slide assemblies and firearms in general is that the assemblies do not accommodate aftermarket sight assemblies in a convenient fashion. Most slide assemblies include fixed iron sights at the front and rear of the slide housing. It is often desired to replace the iron sights with other aftermarket sights. Often, the original rear sight is simply positioned within a groove extending across the width of the housing. By moving the original rear sight from left to right, the shooter can adjust the point of aim of the rear sight.

Similarly, when the user wishes to replace the rear sight with an aftermarket sight, the aftermarket sight is positioned within the same groove and must be adjusted back and forth to the correct position. Thus, any change between sights requires that the pistol be re-sighted by the shooter. Alternatively, the shooter can place the replacement sight on the housing above the original sight but this results in the aftermarket sight not replicating the sight picture of the original sight which can affect shooting performance. Hence, there is also a need for a slide assembly, and firearms in general, that facilitates easier interchangeability between sights.

SUMMARY OF THE INVENTION

The aforementioned needs are satisfied by the present invention which, in one implementation, comprises a replacement slide assembly for a pistol having a frame and a trigger assembly of a first caliber comprising a barrel assembly with a firing chamber and a barrel defining an axis wherein the barrel assembly defines a first protruding member. In this implementation, the slide assembly also comprises a slide housing that is adapted to be positioned on the frame of the pistol such that the recoil of the pistol induces the slide housing to slide backwards along the frame, wherein the slide housing defines a groove having a first section that extends in a direction parallel to the axis of the barrel that receives the first protruding member so that the engagement between the first protruding member and the first section of the groove induces the slide housing to slide in a direction parallel to the axis of the barrel of the barrel assembly.

In another implementation, the aforementioned needs are satisfied by a firearm comprising: a barrel assembly having a firing chamber and a barrel wherein the barrel defines an axis and a frame that includes a trigger assembly, wherein the barrel assembly is mounted in a defined relationship to the frame. In this implementation the firearm also comprises a surface that is mounted in a defined relationship to the barrel, wherein the surface defines a first recess with at least one mounting component and a sight platform that is sized to be positioned within the recess and engage with the mounting component such that the sight platform is maintained in a fixed relationship with the barrel axis when mounted within the recess and engaged with the mounting component and wherein the sight platform defines an adjustable sight mounting location. In this implementation the firearm also comprises a sight that is mounted in the adjustable sight mounting location so that the sight can be adjusted into a first orientation with respect to the sight platform so as to be in a defined relationship with the axis of the barrel and wherein the sight platform can be removed from the recess and returned to the recess and the sight is maintained in the same first orientation with respect to the axis of the barrel.

These and other objects and advantages of the present invention will become more apparent from the following description taken in conjunction with the accompanying drawings.

BRIEF DESCRIPTION OF THE DRAWINGS

*FIG. 4A is a detailed perspective view of the slide housing of FIG. 4.*

DETAILED DESCRIPTION OF THE PREFERRED EMBODIMENT

Figure 1:
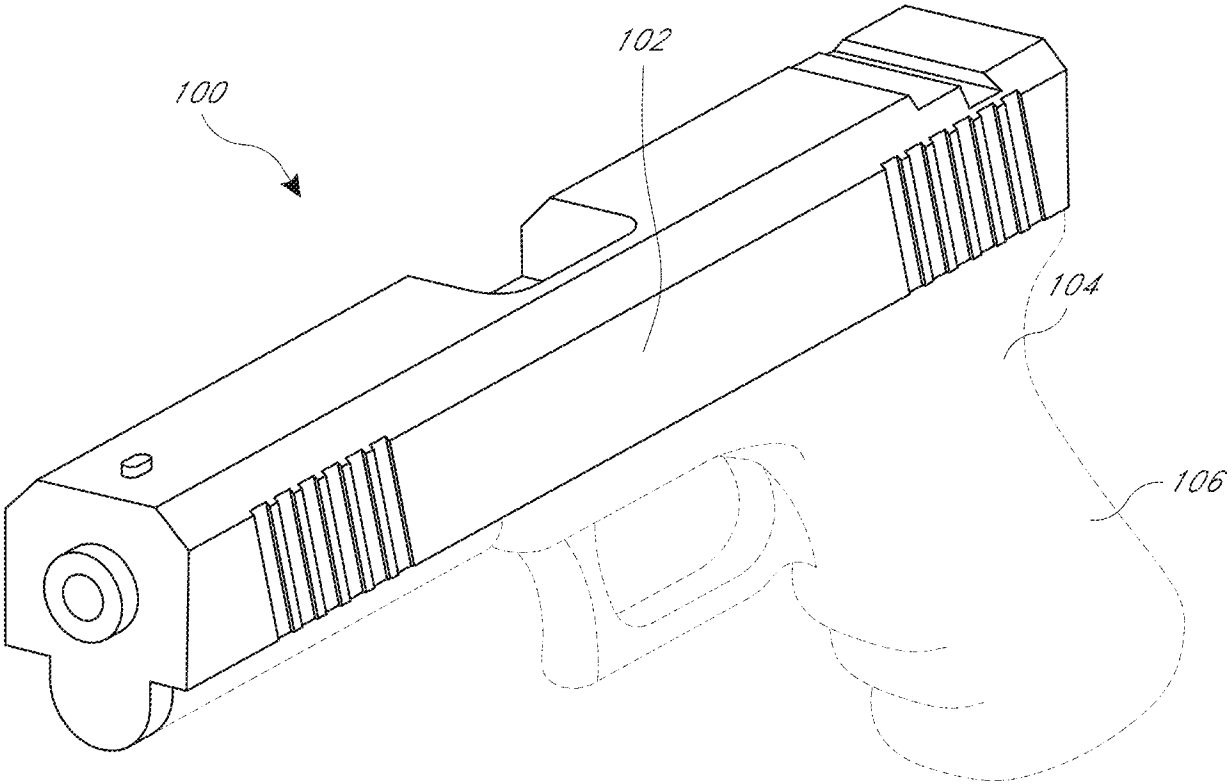
FIG. 1 is a perspective view of a pistol incorporating one embodiment of a replacement slide assembly.

Reference will now be made to the Figures wherein like numerals refer to like parts throughout. Referring to FIG. 1, an exemplary semi-automatic pistol 100 is shown. This pistol 100 can comprise any of a number of different pistols without departing form the scope of the present invention and can, in one or more embodiments, comprise a Model 17, 19 or 26 Glock™ pistol of varying calibers. As discussed below, the original slide of the pistol 100 has been replaced with a replacement slide 102 that houses a different caliber of firing chamber and barrel to allow the pistol 100 to be used with a different caliber of cartridge.

In one specific embodiment discussed herein, a standard 9 mm or .40 caliber slide assembly has been replaced by a .22 caliber slide assembly to allow the shooter to shoot the pistol with reduced power and lower cost ammunition. However, it will be apparent that the replacement slides 102 discussed below can comprise any of a number of different calibers of slides without departing from the scope of the present invention.

As shown in FIG. 1, the pistol 100 includes the slide assembly 102 that is mounted on a frame 104. The frame 104 defines a hand grip 106 and also has a trigger assembly 110 that the shooter uses to fire the pistol 100 in a well-known manner. As will be discussed below, the interior of the handgrip includes a magazine, such as a detachable box magazine 180 (FIG. 2D), that holds cartridges to be fired by the pistol.

The slide assembly 102 includes a barrel 112 and a firing chamber 114. Cartridges are inserted into the firing chamber and a firing pin assembly (discussed below) is actuated by the trigger assembly to fire the cartridges in the firing chamber 114 propelling a slug or other projectile(s) down the barrel 112 in a well- known manner. The firing of the cartridge results in recoil that causes a housing 136 of the slide assembly 102 to move backwards toward the rear of the frame 104 in a manner that will be described in greater detail below. This results in the re-cocking of the firing pin assembly and also results in a cartridge in the magazine being loaded into the firing chamber 114 and the empty shell of the fired cartridge being ejected from the firing chamber 114 in a well-known manner.

As is also shown in FIG. 1, the replacement slide assembly 102 also includes sights that comprise a sight mount 120 and a front sight 122. The sights of the slide assembly can comprise either fixed or adjustable iron sights or can comprise optical sights. As will be discussed in greater detail below, the pistol 100 can also include an interchangeable sight assembly 200 (FIGS. 4-6) that permits interchanging of the sights without re-sighting of the pistol to accommodate the different sights.

Referring now to FIGS. 2A-2D, the replacement slide assembly 102 will be described in greater detail. The replacement slide assembly 102 includes a barrel assembly 126 that includes a firing chamber 130 that receives the cartridge from the magazine in a well-known manner and a barrel 132. The barrel assembly 126 is positioned within a space 134 (FIG. 2B) in the slide housing 136 of the slide assembly 102 so that the barrel is positioned adjacent or protrudes slightly outward of a barrel opening 140 of the slide housing 136.

The space 134 of the slide housing 136, in this embodiment, extends the full length of the slide housing so as to be partially enclosed by two side walls 142a, 142b. The forward portion 144a of the space 134 receives the barrel assembly 126 and the rear portion 144b of the space receives a firing pin assembly 146. There is an ejection part 150 that defines a border between the forward portion 144a and the rear portion 144b of the interior space 134 of the housing 136.

Figure 2A:
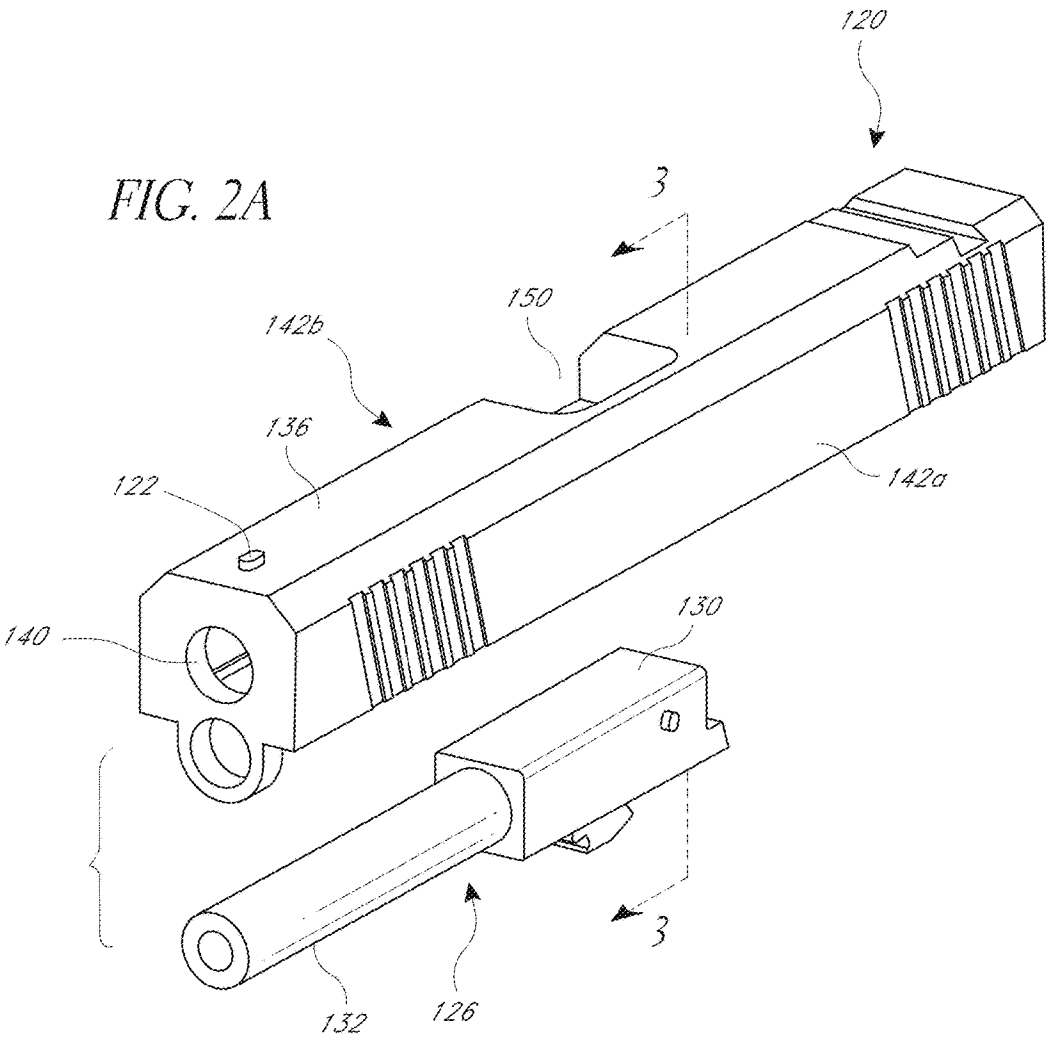
FIG. 2A is an exploded perspective view of the replacement slide assembly of FIG. 1.
Figure 2B:
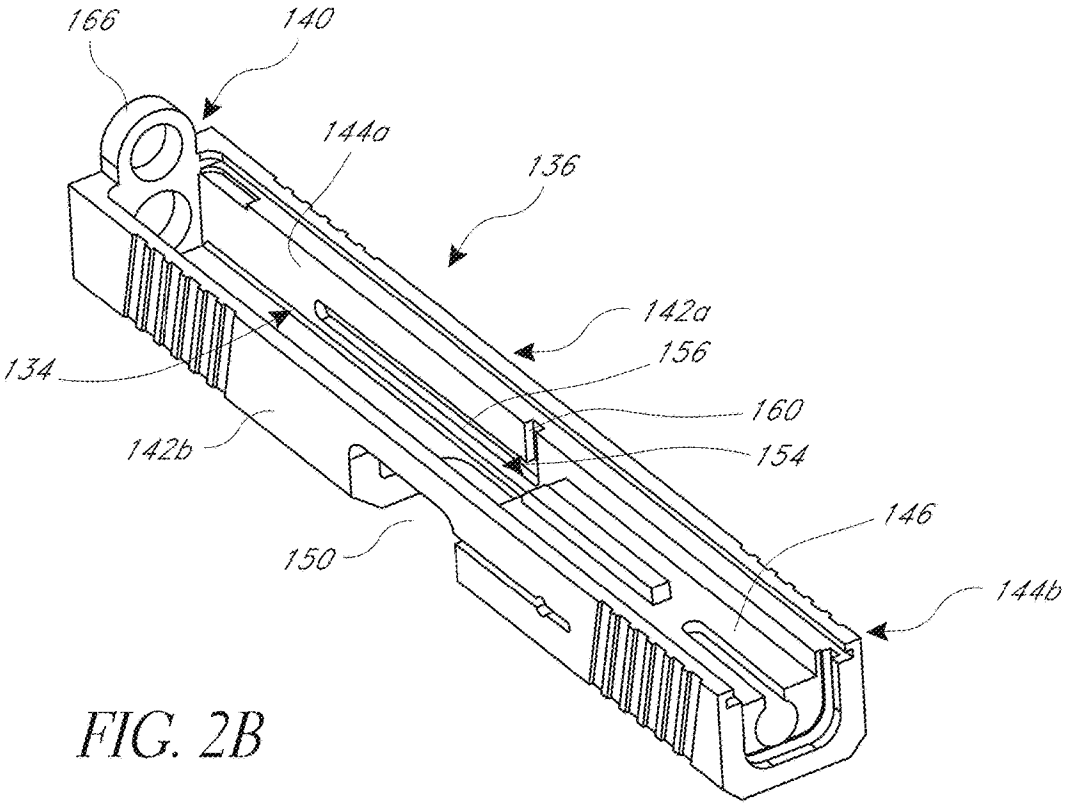
FIG. 2B is a perspective view of the replacement slide assembly of FIG. 1 illustrating the interior portions of the slide assembly.
Figure 2C:
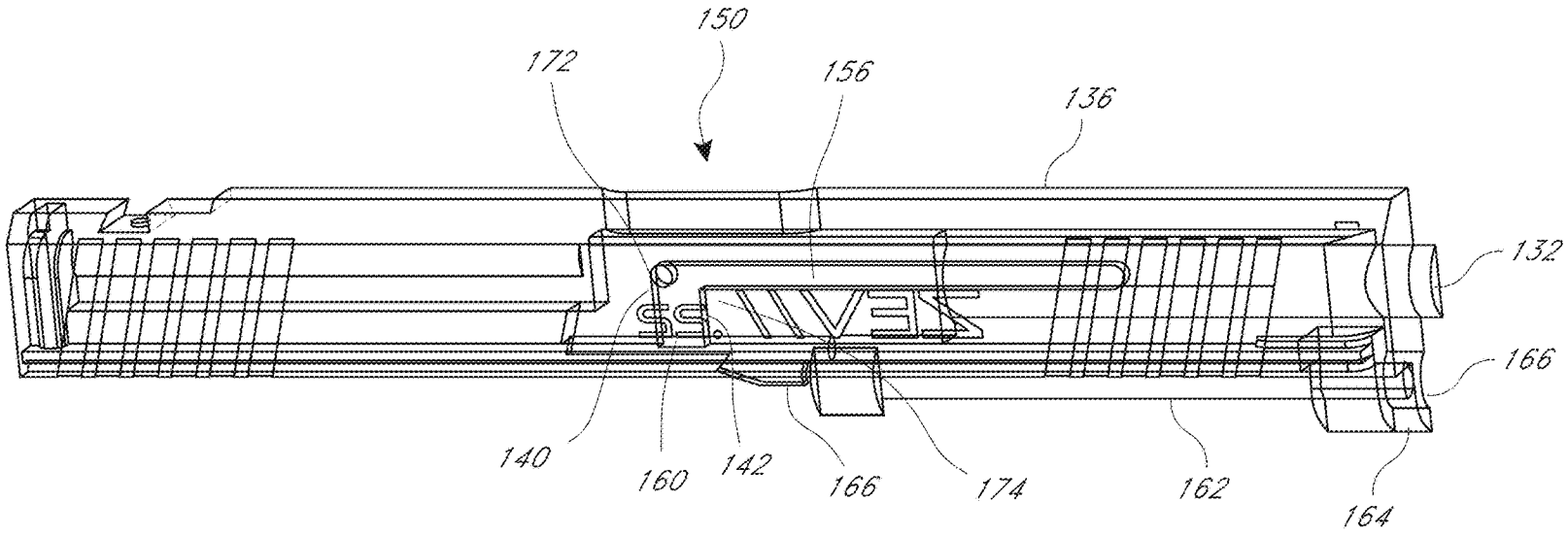
FIG. 2C is a side view of the replacement slide assembly of FIG. 1 showing the interior components in phantom.

As is also shown in FIGS. 2A-2C, the inner wall of the side wall 142a includes a groove 154 that receives a boss or protrusion 152 that is formed on a side wall of the firing chamber 130 of the barrel assembly 126. The groove 154 includes a horizontal portion 156 and a vertical portion 160.

The horizontal portion 156 of the groove 154 is preferably parallel to the axis of the barrel 112 and controls the movement of the slide housing 136 during recoil of the slide assembly 102 as the pistol 100 is fired. As will be describe below, it is desirable that the slide housing 136 travel horizontally backwards and forwards during the firing cycle with respect to the frame 104 when the pistol 100 is level. Positioning the boss 152 within the horizontal portion 156 of the groove 154 restricts the motion of the slide housing 126 to be in a back and forth direction that is parallel to the axis of the barrel 132, e.g., horizontally when the barrel and pistol are level.

As is also shown, the horizontal portion 156 of the groove 154 is formed so as to be forward of the ejection port 150 and a firing pin assembly 116, which facilitates removal of the barrel assembly 126 for maintenance purposes as will be described in greater detail below. The vertical portion 160 of the groove 154 is also located forward of the firing pin assembly 116 adjacent a forward region of the ejector port 150 to facilitate removal of the barrel assembly 126 from the slide housing 136.

As shown, the vertical portion 160 of the groove is wider than the horizontal portion 156. In one specific implementation, the horizontal portion 156 of the groove 154 is 2.43 inches long and is 0.13 inches wide and the vertical portion is 0.33 inches wide. In this implementation, the boss 152 has a diameter of approximately 0.10 inches. Of course, persons of ordinary skill in the art will appreciate that the dimensions can vary depending upon the application without departing from the scope of the present invention.

Referring now to FIG. 2C, a spring return mechanism 162 is shown. The first seat 164 for the spring return mechanism 162 is formed on a bottom surface of the firing chamber 130 of the barrel assembly 126. This can comprise a standard seat such as those found on Glock™ brand pistols and can comprise a hook assembly that receives a first end of the spring return mechanism 162. A second seat 166, in the form of an opening adjacent the barrel opening 140, is formed on the slide housing 136. The spring return mechanism 162 is thus mounted between the barrel assembly 126 and the slide housing 136 such that the spring return mechanism 162 returns the slide housing 136 to a forward position after the slide assembly has been recoiled backwards when the pistol is fired. The operation of the spring return mechanism 162 is the same as spring return mechanisms understood in the art.

FIG. 2C illustrates the groove 154 and boss 152 discussed above in greater detail. As shown, in the forward position of the slide housing 136, when the pistol is ready to be fired, the boss 152 is positioned to the rear of the horizontal groove 156 adjacent a back edge 172 of the vertical groove 160. A front edge 174 of the vertical groove 160 is formed sufficiently spaced from the back edge 172, that when the shooter wishes to disassemble the barrel assembly 126 from the slide housing 136, the shooter can remove the spring return mechanism 162 and separate the barrel assembly 126 from the firing pin assembly 116 so that the back end of the barrel assembly 126 containing the firing chamber 130 can then pivot downward via the vertical groove 160. This allows the shooter to remove the front end of the barrel 132 from the barrel opening 140.

Moreover, reassembly of the barrel assembly 130 into the slide housing 136 is also greatly simplified as it does not require the removal of any slide members or interconnection of the barrel assembly to any slide members; the barrel 132 must simply be positioned within the barrel opening 140 and the boss 152 is then slid upward through the vertical groove 160 so as to be aligned with the horizontal groove 156. The spring return mechanism 162 is then positioned between the first seat 164 on the slide housing 136 and the second seat 166 on the barrel assembly 126 which then retains the barrel assembly 126 in the orientation shown in FIG. 2C.

Figure 2D:
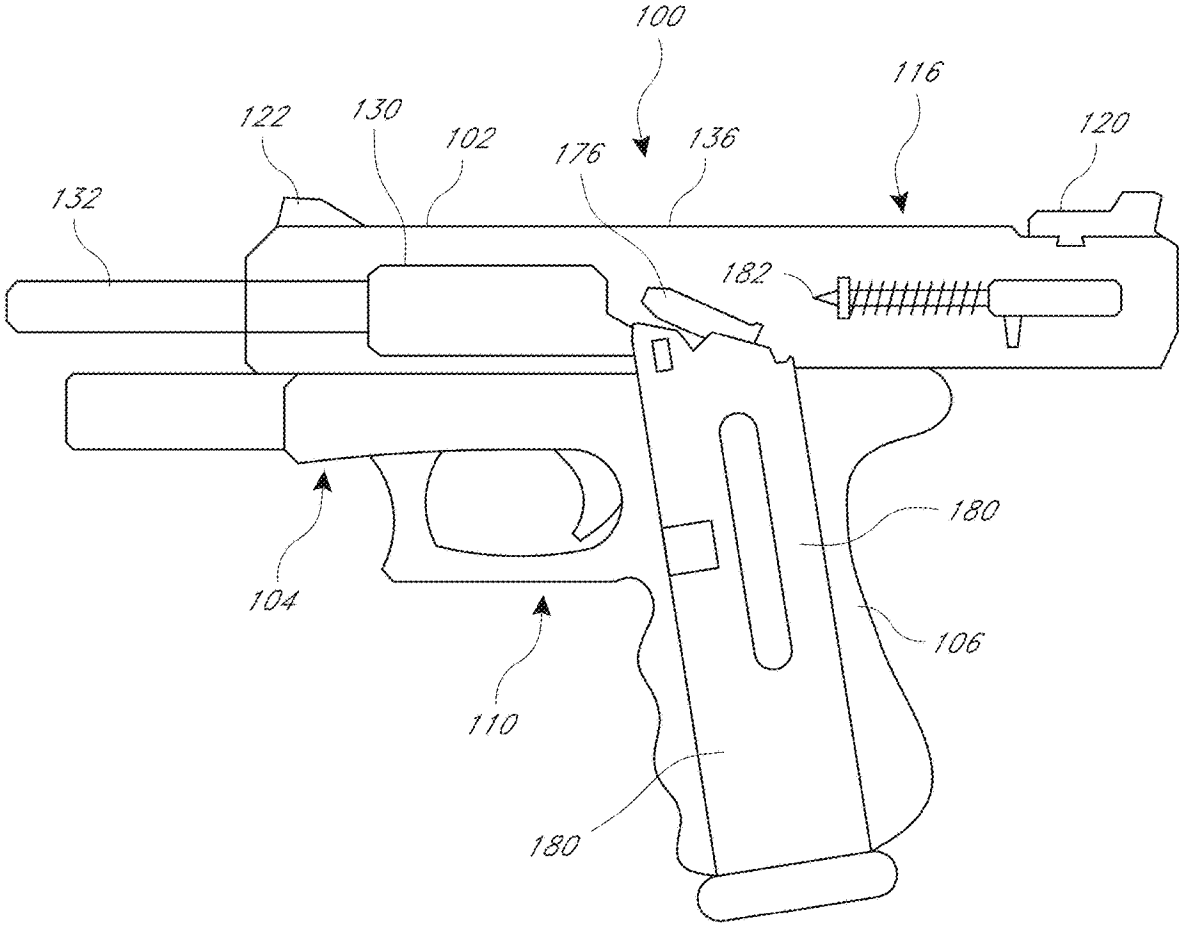
FIG. 2D is a side view of the replacement slide assembly of FIG. 1 as it is positioned on the frame of the pistol of FIG. 1.

FIG. 2D is a side perspective view of the pistol 100 incorporating one embodiment of a replacement slide assembly 102 with the slide housing 136 in the fully retracted position that permits loading of a new round into the firing chamber 130. In this embodiment, the replacement slide 102 is configured to permit a larger caliber pistol, e.g., a 9 mm or .40 caliber pistol, to shoot a smaller caliber round such as a .22 caliber round. It is understood that a .22 caliber round produces significantly less recoil than a 9 mm or .40 caliber pistol and thus the operation of the replacement slide assembly 102 must be modified to accommodate for the reduced recoil.

In one implementation, for a replacement slide assembly 102 used in conjunction with a Glock™ brand pistol, the replacement slide assembly 102 induces the barrel to remain horizontal during cycling of the slide assembly. In standard Glock™ pistols, the barrel assembly drops slightly when the barrel assembly is separated from the firing pin assembly 116 as the slide housing 136 beings to cycle. This lowers the firing chamber 130 slightly so as to permit loading of a next round 176 in a magazine 180 into the firing chamber 130 as the slide housing 136 returns to its initial position shown in FIG. 2C.

However, smaller ammunition, such as .22 caliber ammunition can produce insufficient recoil to achieve this pivoting as well as forcing the slide housing 136 back sufficiently to eject the empty shell casing, cock the trigger assembly 120, etc. So, to reduce the forces operating against the recoil of the slide assembly 102, in this embodiment, the replacement magazine 180 is positioned to sit higher into the slide assembly 102 so that when the firing pin assembly 116 is removed over the top of the magazine 180, the spring loaded magazine urges the next round into the ejection port 150 so that the round 176 is substantially co-axial with the axis of the barrel thereby permitting easier loading of the round 176.

Figure 3:
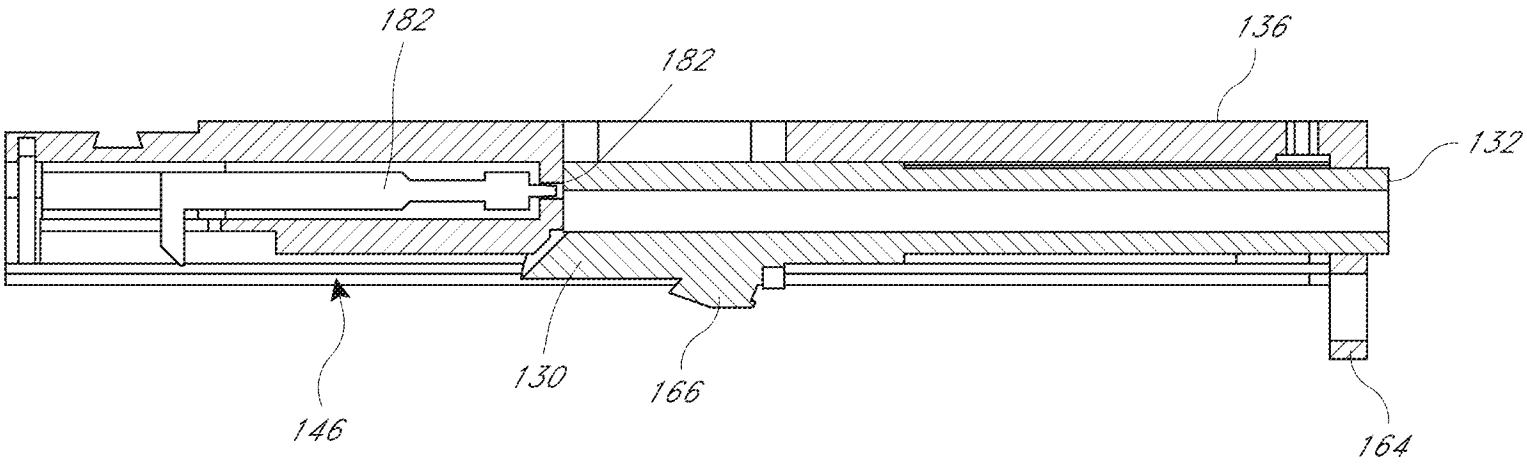
FIG. 3 is a cross-sectional view of one firing pin assembly of the replacement slide assembly of FIG. 1.

It will be further understood that most larger caliber pistols shoot center fire ammunition and .22 caliber ammunition is rim fire. This requires that the firing pin 182 of the firing pin assembly 116 be offset from the center axis of the barrel 132 and firing chamber 130 so as to strike the rim of the .22 cartridge to fire the cartridge. FIG. 3 illustrates an example of one implementation of an offset firing pin 182 in a replacement firing pin assembly 116.

Figure 4:
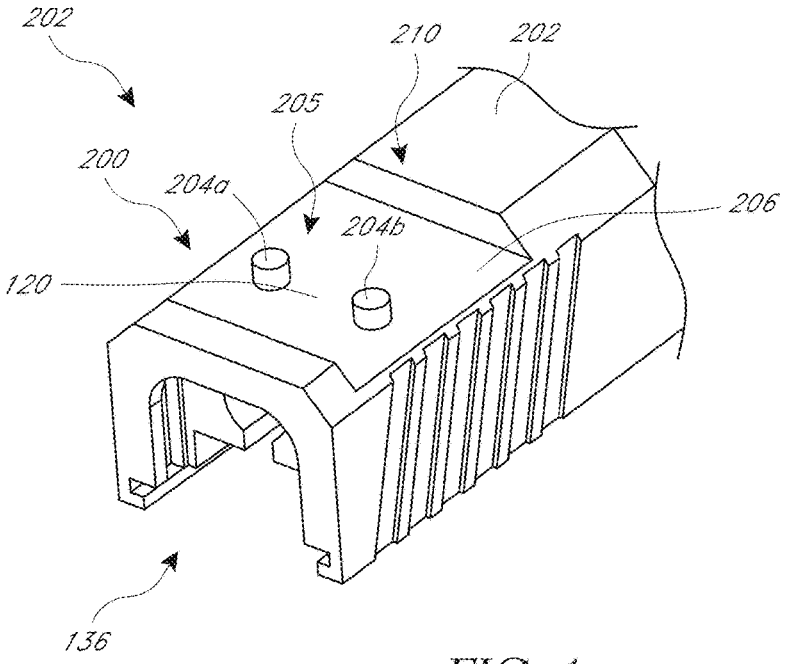
FIG. 4 is a perspective view of slide housing for a pistol with a platform for an interchangeable sight assembly.
Figure 5:
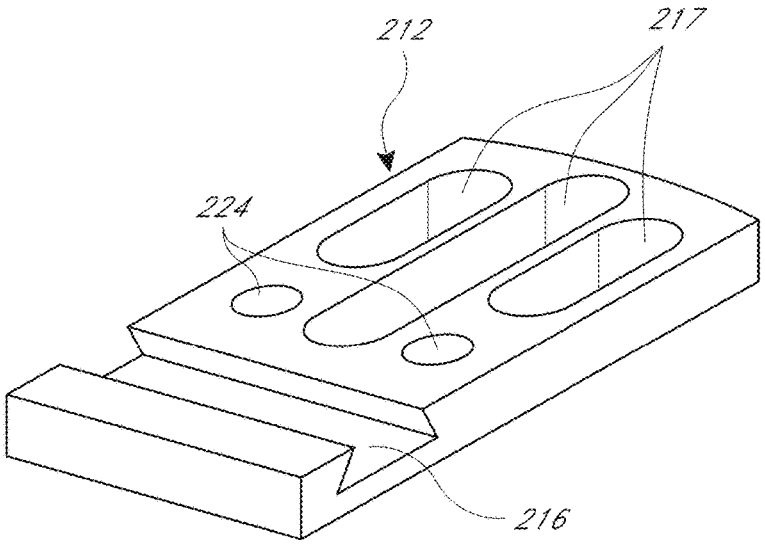
FIG. 5 is a perspective view of a mounting block for interchangeable sights.

Referring now to FIGS. 4 and 5, the unique sight mounting assembly 200 will now be described. It will be apparent from the following description that this sight mounting assembly can be used in conjunction with an original slide assembly for a semiautomatic pistol, a replacement slide assembly or it can be used in conjunction with any other type of pistol or firearm without departing from the scope of the present invention.

In this specific embodiment, the rear 202 of the slide housing 136 includes a rear sight mount 120 as discussed above. In this embodiment, the rear sight mount 120 includes one or more fixed mounting components 204 that are formed in a recess 205 having a recessed surface 206 that is recessed below the level of the main surface 210 of the slide housing 136. Preferably, the mounting projections 204 comprise a plurality of mounting projections that extend in a line that intersects the axis of the barrel 132 for the reasons given below.

Figure 6A:
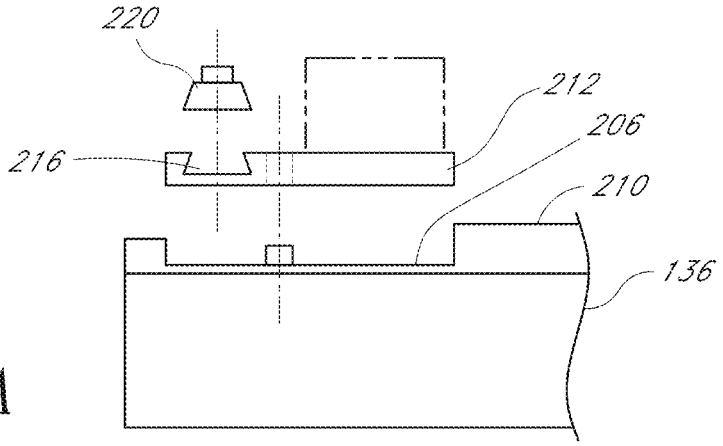
FIGS. 6A and 6B are side views of the sight assemblies of FIGS. 4 and 5.

FIG. 5 illustrates a sight mounting plate 212 that is adapted to be positioned within the recess 205 on the recessed surface 206. As is shown, the sight mounting plate 212 has openings 214 that are sized and positioned on the plate to receive the fixed mounting components 204. The sight mounting plate 212 also defines a dove-tailed groove 216 that extends across the width of the plate 212 that is adapted to receive a fixed sight 220 (FIG. 6A). The plate 212 preferably has dimensions that match the dimensions of the recess 205 and so that the plate 212 sits flush with the main surface 210 of the slide housing 136. As shown, various weight savings or ornamental grooves 217 can also be formed in the plate 212.

The mounting components 204 can comprise projections *having outer walls* that are hollow *and are threaded* and can receive fasteners to secure the plate 212 into the recess (*see, e.g., FIG. 4A*). Alternatively, the mounting components 204 can be screw holes that receive screws or other fasteners to secure the plate 212 into the recess. Alternatively, the mounting components 204 can be projections that fit through the holes 214 of the plate 212 so that the plate 212 is secured in the recess 205 via friction.

Regardless of how the mounting plate 212 is secured within the recess 205, the mounting plate 212, when positioned within the recess 205, is maintained in a fixed relationship with the front sight 122 and also with respect to the axis of the barrel 132. Thus, the mounting plate 212 can be positioned within the recess 205 and secured thereto. The fixed sight 220 can then be moved laterally across the groove 216 until it is properly aligned with the front sight 122 so that the pistol 100 is sighted in. Due to the fixed arrangement of the plate 212 with respect to the axis of the barrel 132, the plate 212 can be removed and re-installed into the recess 205 and the sighting orientation of the fixed sight 220 with respect to the front sight 122 can be maintained. Thus, the sight can be switched out without requiring the shooter to re-sight the firearm.

Figure 6B:
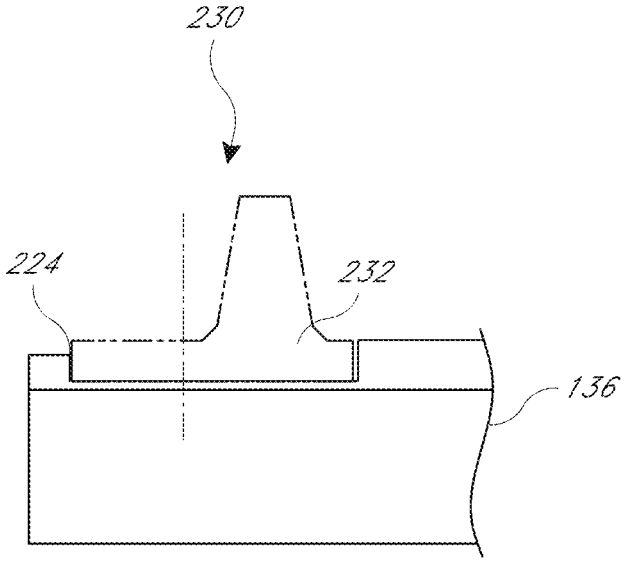

Further, as shown in FIG. 6B, an optical sight 230 such as a Trijicon RMR, a Leupold Delta Point, an Insight MRDS, etc. can also have a mounting plate 232 that is sized to fit within the recess 205 and *has openings with inner walls that* engage with the mounting components 204 in the same manner as the mounting plate 212 described above. Thus, the recess 205 and the mounting components 204 allow for the interchangeability between multiple different sights without requiring that the sights be re-sighted to the pistol when switched back and forth.

A further advantage of the recess 205 is that with a typical optical sight 230, the height of the center of the optical sight 230 is reduced by an amount of the recess. In one implementation, the recess is 2 mils deep which results in the center point of a standard optical sight 230 being in line with the visual line of a standard fixed set of iron sights. Consequently, the sight picture of the shooter using an optical sight and an iron sight can be maintained to be closer to each other. This further allows the shooter to hold the pistol with respect to their eyes at about the same orientation regardless of which sight is being used which enhances the shooter's accuracy.

While the foregoing has shown, illustrated and described various embodiments and implementations of the present invention, it will be apparent from the foregoing description that various changes and modifications to the apparatuses described above and the uses thereof may be made by those skilled in the art without departing from the scope of the present invention. Hence, the scope of the present invention should not be limited to the foregoing discussion but should be defined by the appended claims.

What is claimed is:

1. A firearm comprising:

a barrel assembly having a firing chamber and a barrel wherein [a] *the* barrel defines an axis;

a frame that includes a trigger assembly *and a slide,* wherein the barrel assembly is mounted in a defined relationship to the frame;

a surface *on the slide* that is mounted in a defined relationship to the barrel, wherein the surface defines a first recess with at least one mounting component;

a sight platform that is sized to be positioned within the recess and engage with the mounting component such that the sight platform is maintained in a fixed relationship with the barrel axis when [mortared] *mounted* within the recess and engaged with the mounting component and wherein the sight platform defines an adjustable sight mounting location;

the adjustable mounting location being a dovetail groove;

a sight having a dovetail element that is mounted [ill] *in* the adjustable sight mounting location so that the sight can be adjusted into a first orientation with respect to the sight platform so as to be in a defined relationship with the axis of the barrel;

and wherein the sight platform can be removed from the recess and returned to the recess and the sight is maintained in the same first orientation with respect to the axis of the barrel;

wherein the mounting component comprises a projection *having an outer wall* that extends out of a floor of the recess *and is formed on the slide and wherein the mounting component has an opening*;

wherein the sight platform is a planar body defining an aperture *having an inner wall* closely receiving the projection *and wherein the fastener extends through the aperture in the sight platform and into the opening in the projection and wherein the outer wall of the projection engages with the inner wall of the aperture in the sight platform*.

2. The firearm of claim 1, wherein the firearm comprises a pistol having a slide housing and wherein the recess is formed in the slide housing.

3. The firearm of claim 2, wherein the sight comprises a non-optical sight.

4. The firearm of claim 2, wherein the sight comprises an optical sight.

5. The firearm of claim 4, wherein the optical sight defines a sight axis and wherein the recess is sized so as to lower the sight axis to a height that corresponds to the height of a non-optical sight for the firearm.

6. The firearm of claim 5, wherein the recess lowers the sight axis by approximately 2 mils.

7. The firearm of claim 2, wherein the adjustable sight mounting location comprises a groove that extends in a direction that intersects the direction of the axis of the barrel.

8. The firearm of claim 5, wherein the sight has a platform that matches the dovetail configuration of the groove.

9. A pistol slide assembly for mounting a sight, the sight having a dovetail element, comprising:

a slide body having a first mounting facility[,]*;* a sight platform removably mounted to the first mounting facility;

the sight platform defining a second mounting facility including a dovetail groove operable to receive the dovetail element;

wherein the slide body has a primary upper surface, and wherein the first mounting facility is a recess below the level the primary upper surface;

wherein the recess defines a floor surface, and wherein *the* first mounting facility includes a protrusion *having an outer wall* extending above the floor surface*, wherein the protrusion is formed on the slide body and defines an opening that receives a fastener*; and wherein the sight platform is a planar body defining an aperture *having an inner wall* closely receiving the protrusion *and wherein the fastener extends through the aperture in the sight platform and into the opening in the protrusion and wherein the outer wall of the protrusion engages with the inner wall of the aperture in the sight platform*.

10. The pistol slide assembly of claim 9 wherein the protrusion is of limited height and [have upper ends that do] *has an upper end that does* not protrude above the primary upper surface.

11. The pistol slide assembly of claim 9 wherein the protrusion is integrally formed with the slide body.

12. The pistol slide assembly of claim 9 wherein the sight platform fully occupies the recess.

13. The pistol slide assembly of claim 9 wherein the slide *body* is an elongated body, and wherein the dovetail groove is formed perpendicularly to the length of the slide body, such that the sight may be laterally adjusted with respect to the sight platform.

14. The pistol slide assembly of claim 9 wherein [the slide body has a primary upper surface and] the sight platform is removable in a direction perpendicular to the primary *upper* surface.

15. A [sight mounting platform for a] pistol slide, [the pistol slide having an alignment element,] comprising:

*a slide body having an alignment element; and*

*a sight mounting platform, wherein the sight mounting platform comprises* a planar body defining a first interface facility sized to contact the alignment element to locate the *planar* body with respect to the slide *body*; [and]

the *planar* body [deeming] *defining* a dovetail groove operable to receive a sight having a dovetail element;

wherein the alignment element is a recess having a protrusion *with an outer wall*, and the interface facility is an aperture *having an inner wall* adapted to closely receive the protrusion, *wherein the protrusion is formed in the slide body and defines an opening that receives a fastener, and wherein the inner wall of the aperture and the outer wall of the protrusion engage each other*.

*16. A slide for a semi-automatic pistol so that the slide is mounted in a defined relationship with an axis of a barrel of the semi-automatic pistol, the slide comprising:*

*a slide body; and*

*an optical sight;*

*wherein the slide body comprises an upper surface that extends parallel to the axis of the barrel when the slide is mounted on the semi-automatic pistol, wherein the upper surface defines a recess that extends in a direction perpendicular to the axis of the barrel when the slide is mounted on the semi-automatic pistol, wherein the recess has a recessed surface that is recessed below the upper surface of the slide body; and*

*wherein the slide body further comprises a plurality of mounting protrusions having an outer dimension that extends upward from the recessed surface, wherein the mounting protrusions include openings that are sized to receive fasteners, wherein the outer dimension is dimensioned so as to be positioned inside and contact an inner side wall of a mounting opening formed in a base of the optical sight.*

*17. The slide of claim 16, wherein the plurality of mounting protrusions are cylindrical and define a center axis and wherein the openings extend along the center axis and have threaded interiors to receive fasteners to secure the optical sight to the slide body.*

*18. The slide of claim 17, wherein the plurality of mounting protrusions comprise two protrusions.*

*19. A semi-automatic firearm comprising:*

*a barrel assembly having a firing chamber and a barrel wherein the barrel defines an axis;*

*a frame that includes a trigger assembly, wherein the barrel assembly is mounted in a defined relationship to the frame;*

*a slide having an upper surface that extends parallel to the axis of the barrel when the slide is mounted on the semi-automatic firearm, wherein the upper surface defines a recess that extends in a direction perpendicular to axis of the barrel when the slide is mounted on the semi-automatic firearm, wherein the recess has a recessed surface that is recessed below the upper surface of the slide;*

*a plurality of mounting protrusions having an outer dimension that extends upward from the recessed surface, wherein the mounting protrusions include openings that are sized to receive fasteners and wherein the plurality of mounting protrusions are formed on the slide; and*

*an optical sight mounted within the recess wherein the optical sight has a mounting base with openings with inner side walls and wherein the outer dimension of the plurality of mounting protrusions are dimensioned so as to be positioned inside and contact the inner side walls of the mounting openings formed in the mounting base of the optical sight.*

*20. The firearm of claim 19, wherein the plurality of mounting protrusions are cylindrical and define a center axis and wherein the openings extend along the center axis and have threaded interiors to receive fasteners that extend through the mounting base of the optical sight to secure the optical sight to the slide.*

*21. The firearm of claim 20, wherein the plurality of mounting protrusions comprise two protrusions.*

*22. The firearm of claim 19, wherein the optical sight defines a sight axis and wherein the recess is sized so as to lower the sight axis to a height that corresponds to the height of a non-optical sight for the firearm.*

*23. The firearm of claim 22, wherein the recess lowers the sight axis by approximately 2 mils.*

* * * * *